US012580189B2

(12) United States Patent
Jung et al.

(10) Patent No.: US 12,580,189 B2
(45) Date of Patent: Mar. 17, 2026

(54) METHOD OF MANUFACTURING A SECONDARY BATTERY

(71) Applicant: LG ENERGY SOLUTION, LTD., Seoul (KR)

(72) Inventors: Hyun Ok Jung, Daejeon (KR); Dong Jun Lee, Daejeon (KR); Su Yong Shin, Daejeon (KR); Kwang Ho Yoo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 778 days.

(21) Appl. No.: 17/796,932

(22) PCT Filed: May 18, 2021

(86) PCT No.: PCT/KR2021/006193
§ 371 (c)(1),
(2) Date: Aug. 2, 2022

(87) PCT Pub. No.: WO2021/235818
PCT Pub. Date: Nov. 25, 2021

(65) Prior Publication Data
US 2023/0064213 A1 Mar. 2, 2023

(30) Foreign Application Priority Data

May 18, 2020 (KR) ........................ 10-2020-0059378

(51) Int. Cl.
*H01M 4/505* (2010.01)
*H01M 4/38* (2006.01)
(Continued)

(52) U.S. Cl.
CPC ........... *H01M 4/505* (2013.01); *H01M 4/386* (2013.01); *H01M 4/583* (2013.01);
(Continued)

(58) Field of Classification Search
CPC ........... H01M 10/0525; H01M 10/058; H01M 10/44; H01M 10/446; H01M 2004/027;
(Continued)

(56) References Cited

U.S. PATENT DOCUMENTS 8,765,306 B2 * 7/2014 Amiruddin ........... H02J 7/0069
429/231.95
9,040,203 B2 * 5/2015 Kim ...................... H01M 4/485
429/231.95
(Continued)

FOREIGN PATENT DOCUMENTS

CN 102859778 A 1/2013
CN 103928708 A 7/2014
(Continued)

OTHER PUBLICATIONS

Zheng et al. Rational design of the pea-pod structure of SiOx/C nanofibers as a high-performance anode for lithium-ion batteries. Inorg. Chem. Front., 2020, 7, 1762 p. 1762; par. 2 (Year: 2020).*
(Continued)

*Primary Examiner* — James M Erwin
*Assistant Examiner* — Gilberto Ramos Rivera
(74) *Attorney, Agent, or Firm* — Birch, Stewart, Kolasch & Birch, LLP

(57) ABSTRACT

A method of manufacturing a secondary battery, which includes: electrochemically charging a pre-lithiation cell including a positive electrode. The positive electrode comprises a positive electrode active material comprising a lithium manganese-based oxide and a lithium metal counter electrode. The electrochemical charging over-lithiates the positive electrode to form an over-lithiated positive electrode. Then, separating the over-lithiated positive electrode from the pre-lithiation cell and fabricating a secondary battery including the over-lithiated positive electrode and a
(Continued)

negative electrode including a negative electrode active material; subjecting the secondary battery to a first charging to form a first-charged secondary battery; resting the first-charged secondary battery; and subjecting the rested secondary battery to a second charging. The maximum voltage of the secondary battery in the first charging is lower than the maximum voltage of the secondary battery in the second charging.

11 Claims, 3 Drawing Sheets

(51) Int. Cl.

| | | |
|---|---|---|
| *H01M 4/583* | (2010.01) | |
| *H01M 10/0525* | (2010.01) | |
| *H01M 10/058* | (2010.01) | |
| *H01M 10/44* | (2006.01) | |
| *H01M 4/02* | (2006.01) | |

(52) U.S. Cl.

CPC ..... *H01M 10/0525* (2013.01); *H01M 10/058* (2013.01); *H01M 10/44* (2013.01); *H01M 2004/027* (2013.01); *H01M 2004/028* (2013.01)

(58) Field of Classification Search

CPC ......... H01M 2004/028; H01M 4/0445; H01M 4/0447; H01M 4/0459; H01M 4/131; H01M 4/1391; H01M 4/386; H01M 4/483; H01M 4/505; H01M 4/583; H01M 4/587; Y02E 60/10

USPC ....................................................... 429/209

See application file for complete search history.

(56) References Cited

U.S. PATENT DOCUMENTS

| | | | | |
|---|---|---|---|---|
| 2010/0085009 | A1* | 4/2010 | Kang | .................... H02J 7/0019 |
| | | | | 324/427 |
| 2011/0236751 | A1 | 9/2011 | Amiruddin et al. | |
| 2013/0011727 | A1* | 1/2013 | Chang | ............... H01M 10/0566 |
| | | | | 429/188 |
| 2014/0199602 | A1 | 7/2014 | Kim et al. | |
| 2014/0313639 | A1 | 10/2014 | Raman et al. | |
| 2015/0364795 | A1 | 12/2015 | Stefan et al. | |
| 2019/0036118 | A1* | 1/2019 | Ofer | .................. H01M 10/0525 |
| 2020/0235419 | A1 | 7/2020 | Chae et al. | |
| 2022/0328820 | A1 | 10/2022 | Ofer et al. | |

FOREIGN PATENT DOCUMENTS

| | | | |
|---|---|---|---|
| CN | 108385174 | A | 8/2018 |
| CN | 108780884 | A | 11/2018 |
| JP | 2003-197234 | A | 7/2003 |
| KR | 10-0291067 | B1 | 6/2001 |
| KR | 10-2013-0060160 | A | 6/2013 |
| KR | 10-2017-0020850 | A | 2/2017 |
| KR | 10-2016-0003017 | A | 1/2018 |
| KR | 10-1865381 | B1 | 8/2018 |
| KR | 10-2018-0104174 | A | 9/2018 |
| KR | 10-2019-0007296 | A | 1/2019 |
| KR | 10-2020-0024297 | A | 3/2020 |
| KR | 10-2020-0051401 | A | 5/2020 |
| WO | WO 2018/137169 | A1 | 8/2018 |

OTHER PUBLICATIONS

Kim, D. K., et al. Spinel LiMn2O4 nanorods as lithium ion battery cathodes. Nano letters 8.11 (2008) 3948-3952. p. 3948; par. 3 and p. 3951; par. 1 (Year: 2008).*

International Search Report (PCT/ISA/210) issued in PCT/KR2021/006193, dated Aug. 27, 2021.

\* cited by examiner

[FIG. 1]
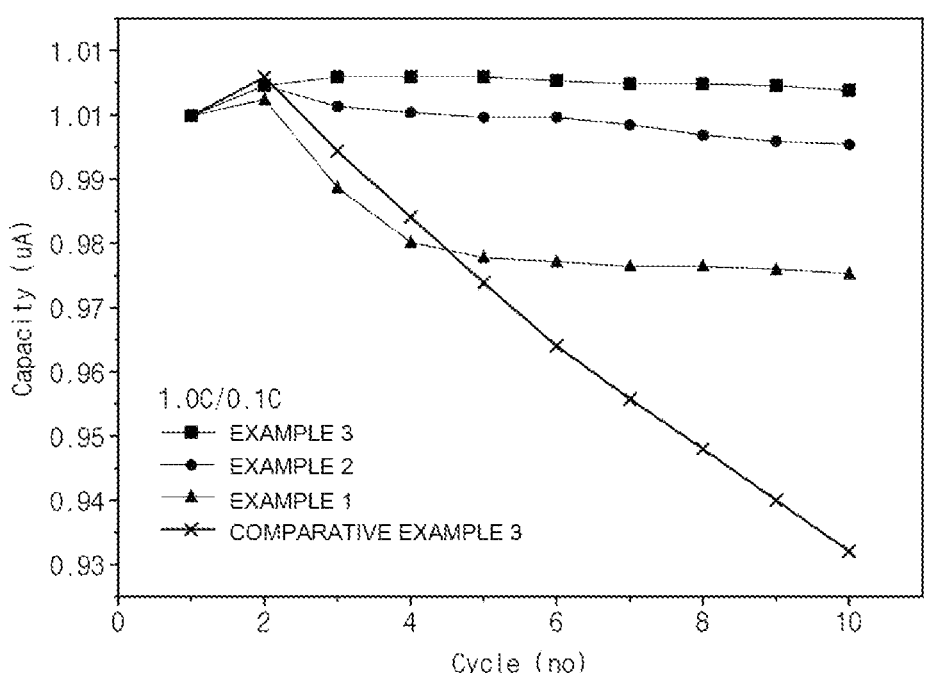
[FIG. 2]
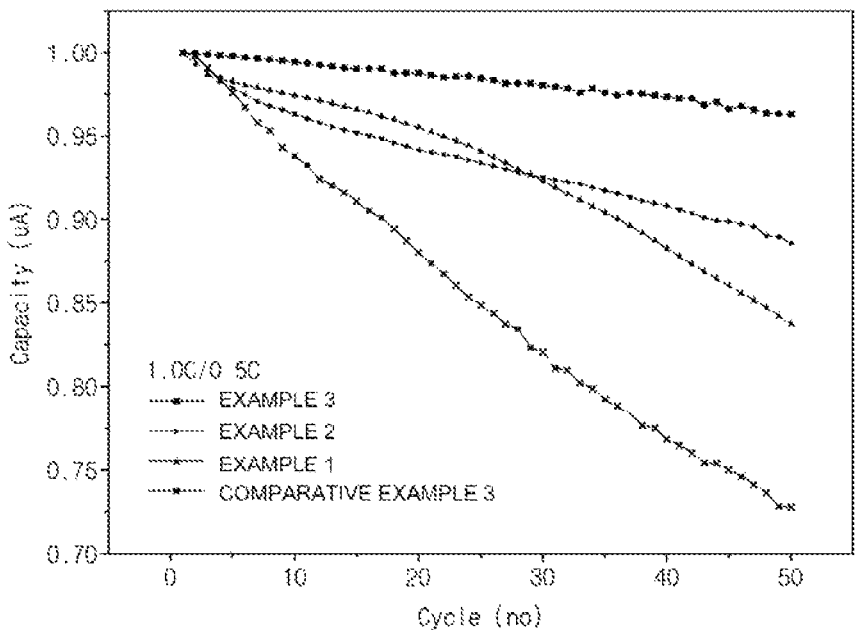

[FIG. 3]
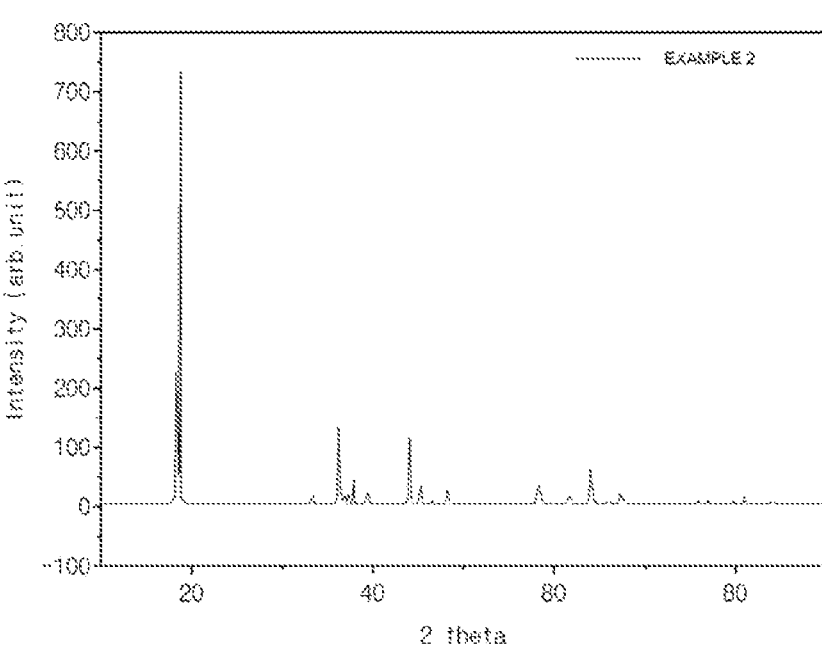
[FIG. 4]
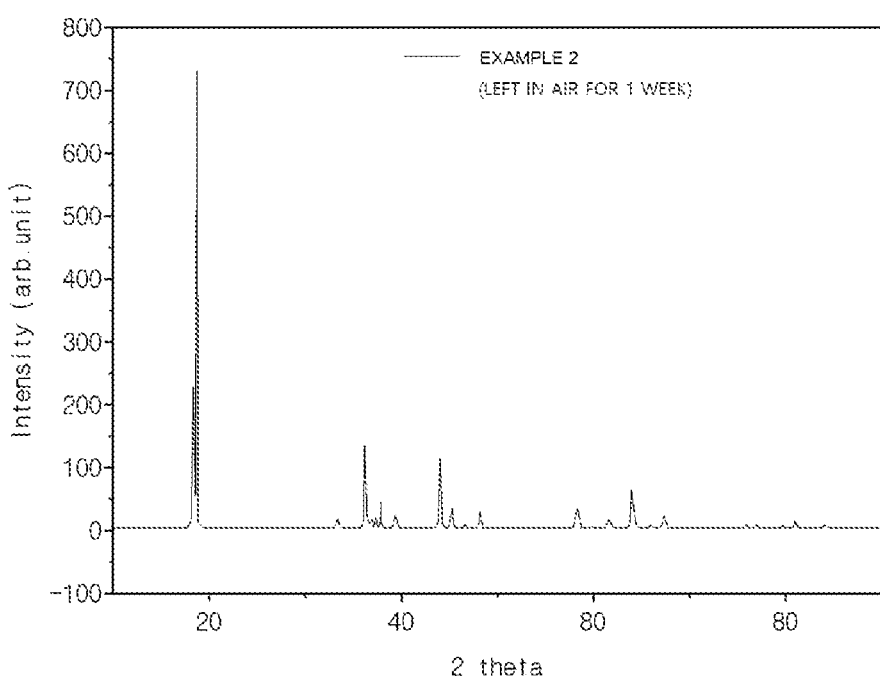

[FIG. 5]
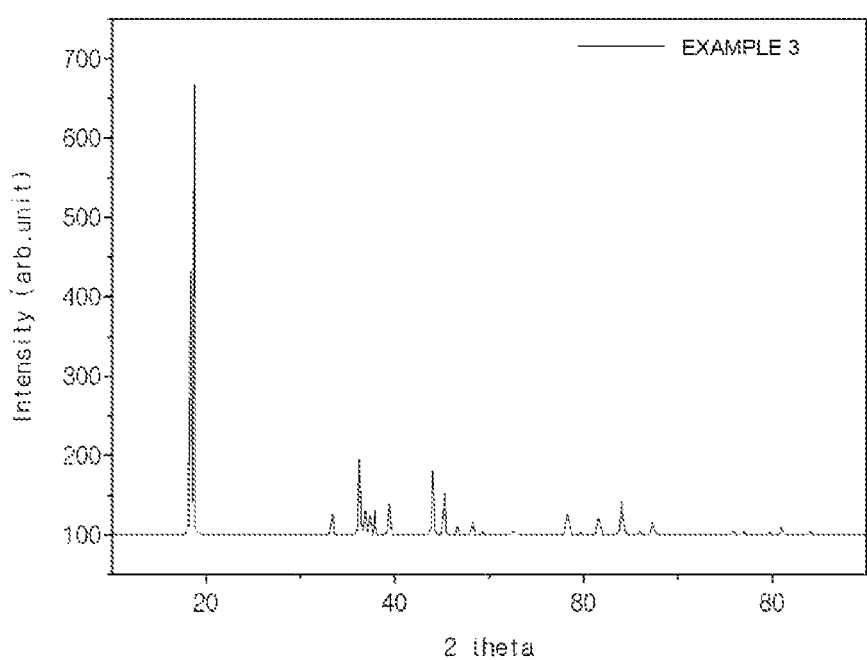
[FIG. 6]
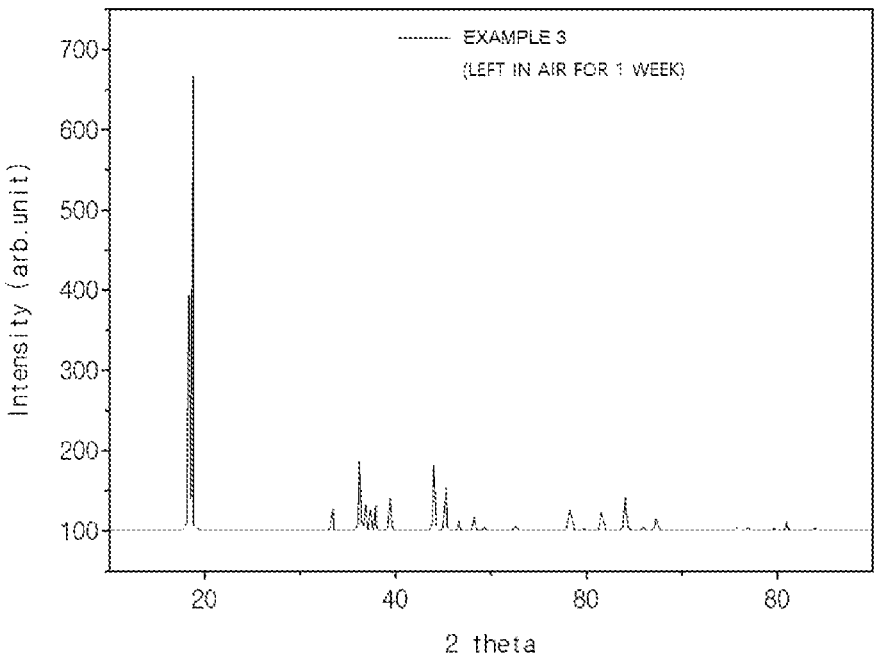

METHOD OF MANUFACTURING A SECONDARY BATTERY

CROSS-REFERENCE TO RELATED APPLICATION

This application claims priority to and the benefit of Korean Patent Application No. 10-2020-0059378, filed on May 18, 2020, the disclosure of which is incorporated herein by reference in its entirety.

TECHNICAL FIELD

The present invention relates to a method of manufacturing a secondary battery.

BACKGROUND ART

With the recent rapid spread of electronic devices using a battery, such as mobile phones, notebook computers, and electric vehicles, the demand for small, lightweight, and relatively high-capacity secondary batteries is rapidly increasing. In particular, lithium secondary batteries have attracted attention as driving power sources for portable devices due to their light weight and high energy density. Accordingly, there have been active research and development efforts to improve the performance of lithium secondary batteries.

The lithium secondary batteries generally include a positive electrode, a negative electrode, a separator interposed between the positive electrode and the negative electrode, an electrolyte, an organic solvent, and the like. In addition, in the positive electrode and the negative electrode, an active material layer including a positive electrode active material or a negative electrode active material may be formed on a current collector. In general, a lithium-containing metal oxide such as $LiCoO_2$ or $LiMn_2O_4$ is used as a positive electrode active material in the positive electrode, and accordingly, a carbon-based active material or a silicon-based active material, which does not contain lithium, is used as a negative electrode active material in the negative electrode.

In the case of such a negative electrode, a passivation film such as a solid electrolyte interface layer (SEI layer) is formed on a surface of the negative electrode during initial charging, and the passivation film improves the aging of the negative electrode structure and the reversibility of the negative electrode by preventing the penetration of an organic solvent into the negative electrode and suppressing a decomposition reaction of the organic solvent, and thus enables use as a negative electrode. However, since the formation of the passivation film is an irreversible reaction, the consumption of lithium ions is caused, resulting in a decrease in the capacity of a battery, and as battery cycles are repeated, lithium ions are consumed, and capacity and cycle lifetime are reduced.

Therefore, negative electrode pre-lithiation methods, in which a passivation film is formed on a surface of the negative electrode in advance through lithium intercalation into the negative electrode to prevent capacity reduction and improve cycle lifetime, have been developed.

For example, pre-lithiation methods such as bringing lithium metal into contact with the negative electrode to diffuse lithium into the negative electrode structure or placing the negative electrode in a lithium salt-containing solution and electrochemically charging the negative electrode while using lithium metal as a counter electrode are known.

However, the negative electrode pre-lithiated by the above process has the disadvantage that handling and management are not easy due to the instability of the negative electrode active material alloyed with lithium. Therefore, when manufacturing a secondary battery using the pre-lithiated negative electrode, assembly should be performed immediately or strict environmental control is required, which is not preferable because process costs may increase.

Meanwhile, a method of over-lithiating a positive electrode rather than a negative electrode by intercalating lithium into the positive electrode and manufacturing a secondary battery using the over-lithiated positive electrode and a negative electrode, in which the negative electrode is pre-lithiated as lithium is transferred from the over-lithiated positive electrode to the negative electrode, has been researched.

In this regard, among positive electrode active materials, lithium manganese-based oxides such as $LiMn_2O_4$ have attracted attention due to their excellent structural stability and high output characteristics. However, when a positive electrode including a positive electrode active material containing a lithium manganese-based oxide is over-lithiated, problems such as the phase change, damage, and performance degradation of the positive electrode active material may occur, and as the positive electrode is over-lithiated, a phenomenon in which the potential of the positive electrode becomes lower than the potential of a negative electrode (e.g., reverse potential phenomenon) may occur, resulting in unstable charging and discharging of a secondary battery, and as a result, the pre-lithiation of the negative electrode is not easily performed.

Korean Patent Registration No. 10-0291067 discloses a method of pre-lithiating a carbon electrode and a method of manufacturing a lithium secondary battery using the same.

RELATED-ART DOCUMENT

Patent Document

Korean Patent Registration No. 10-0291067

DETAILED DESCRIPTION OF THE INVENTION

Technical Problem

The present invention is directed to providing a method of manufacturing a secondary battery including pre-lithiating a negative electrode after over-lithiating a positive electrode including a positive electrode active material containing a lithium manganese-based oxide, in which the instability of battery charging/discharging that may occur due to a phase change of the over-lithiated positive electrode and the occurrence of a reverse potential is prevented, and lithium is smoothly transferred from the over-lithiated positive electrode to the negative electrode, and thus, the initial efficiency and lifetime characteristics of the negative electrode are improved.

Technical Solution the present invention provides a method of manufacturing a secondary battery, which includes: electrochemically charging a pre-lithiation cell comprising a positive electrode, wherein the positive electrode comprises a positive electrode active material comprising a lithium manganese-based oxide and a lithium metal counter electrode, wherein the electrochemical charging over-lithiates the positive electrode; separating the over-lithiated positive electrode from the pre-lithiation cell and fabricating a secondary battery comprising the over-lithiated positive electrode and a negative electrode comprising a negative electrode active material; subjecting the secondary battery to a first charging; resting the first-charged secondary battery; and subjecting the rested secondary battery to a second charging, wherein the maximum voltage of the secondary battery in the first charging is lower than the maximum voltage of the secondary battery in the second charging.

Advantageous Effects

In a method of manufacturing a secondary battery of the present invention, a positive electrode including a positive electrode active material containing a lithium manganese-based oxide is used, after manufacturing a secondary battery including an over-lithiated positive electrode and a negative electrode, a process of charging the secondary battery is carried out to induce pre-lithiation that compensates for the irreversible capacity of the negative electrode. In particular, the charging of the secondary battery is achieved through first charging performed at a relatively low voltage, resting, and second charging performed at a relatively high voltage. Since the unstable phase of the positive electrode active material which may occur due to the over-lithiation of the positive electrode can be changed to a stable phase through the first charging step and the resting step, the degradation of active material performance can be prevented. In addition, since lithium can be stably transferred to the negative electrode by the second charging, the initial efficiency of the negative electrode can be improved and the degree of positive electrode over-lithiation is increased, and therefore, lifetime characteristics can be improved.

DESCRIPTION OF DRAWINGS

FIG. 1 is a graph showing a change in discharge capacity of Examples 1, 2, 3, and Comparative Example 3 according to the repetition of cycles in Experimental Example 2-1.

FIG. 2 is a graph showing a change in discharge capacity of Examples 1, 2, 3, and Comparative Example 3 according to the repetition of cycles in Experimental Example 2-2.

FIG. 3 is a graph showing X-ray diffraction (XRD) analysis peaks of an over-lithiated positive electrode of Example 2.

FIG. 4 is a graph showing XRD analysis peaks of the over-lithiated positive electrode of Example 2 after being left in air for one week.

FIG. 5 is a graph showing XRD analysis peaks of an over-lithiated positive electrode of Example 3.

FIG. 6 is a graph showing XRD analysis peaks of the over-lithiated positive electrode of Example 3 after being left in air for one week.

MODES OF THE INVENTION

Terms and words used in this specification and the claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

The terms used in the present specification have been used only for the purpose of describing exemplary embodiments and are not intended to limit the present invention. Singular expressions include plural expressions unless the context clearly indicates otherwise.

It will be understood that terms such as "comprises," "comprising," "includes," "including," "has," or "having," when used in the present specification, specify the presence of stated features, numbers, steps, components, or combinations thereof and do not preclude the possibility of the presence or addition of one or more other features, numbers, steps, components, or combinations thereof.

In the present specification, an average particle diameter $(D_{50})$ is defined as a particle diameter corresponding to the 50% cumulative volume in each particle diameter distribution curve. The average particle diameter $(D_{50})$ may be measured using, for example, a laser diffraction method. The laser diffraction method generally allows for the measurement of a particle diameter ranging from a submicron level to several millimeters and can produce a result having high reproducibility and high resolution.

Hereinafter, the present invention will be described in detail.

<Method of Manufacturing Secondary Battery>

The present invention relates to a method of manufacturing a secondary battery, and more particularly, to a method of manufacturing a lithium secondary battery.

A method of manufacturing a secondary battery of the present invention includes: electrochemically charging a pre-lithiation cell comprising a positive electrode, wherein the positive electrode comprises a positive electrode active material comprising a lithium manganese-based oxide and a lithium metal counter electrode, wherein the electrochemical charging over-lithiates the positive electrode; separating the over-lithiated positive electrode from the pre-lithiation cell and fabricating a secondary battery comprising the over-lithiated positive electrode and a negative electrode comprising a negative electrode active material; subjecting the secondary battery to a first charging; resting the first-charged secondary battery; and subjecting the rested secondary battery to a second charging, wherein the maximum voltage of the secondary battery in the first charging is lower than the maximum voltage of the secondary battery in the second charging.

Conventionally, methods of over-lithiating a positive electrode and then transferring lithium from the over-lithiated positive electrode to pre-lithiate a negative electrode were studied. However, the over-lithiation of a positive electrode caused a phase change, damaging a positive electrode active material, lowering the performance of the active material, and making the charging and discharging of a secondary battery unstable, and therefore, the pre-lithiation of the negative electrode could not be stably performed.

In order to solve this problem, in the method of manufacturing a secondary battery of the present invention in which a positive electrode including a positive electrode active material containing a lithium manganese-based oxide is used, after manufacturing a secondary battery including an over-lithiated positive electrode and a negative electrode, a process of charging the secondary battery is carried out to induce pre-lithiation that compensates for the irreversible capacity of the negative electrode. In addition, in the method of manufacturing a secondary battery of the present invention, the charging of the secondary battery is achieved through first charging performed at a relatively low voltage, resting, and second charging performed at a relatively high voltage. The first charging performed at a relatively low voltage changes an unstable phase increased in the positive electrode active material due to over-lithiation to a stable phase and thus stabilizes the positive electrode, the resting process reduces the non-uniformity of the positive electrode, and the second charging allows the positive electrode active material, which now has a stable phase, to stably supply lithium to the negative electrode. Therefore, according to the method of manufacturing a secondary battery of the present invention, it is possible to compensate for the irreversible capacity of the negative electrode and manufacture a secondary battery having a negative electrode with improved initial efficiency and lifetime characteristics.

<Over-Lithiation of Positive Electrode>

The method of manufacturing a secondary battery of the present invention includes electrochemically charging a pre-lithiation cell including a positive electrode including a positive electrode active material containing a lithium manganese-based oxide and a lithium metal counter electrode to over-lithiate the positive electrode.

In the present specification, the over-lithiation may mean that lithium is intercalated into the positive electrode at a level exceeding 100% of positive electrode charge capacity.

The pre-lithiation cell may be prepared in order to obtain an over-lithiated positive electrode by overcharging a positive electrode active material including a lithium manganese-based oxide with lithium.

The positive electrode includes a positive electrode active material. In addition, the positive active material includes a lithium manganese-based oxide.

The lithium manganese-based oxide can be preferably used as a positive electrode active material in terms of having excellent structural stability and high output characteristics. However, when a positive electrode including a positive electrode active material containing a lithium manganese-based oxide is over-lithiated by electrochemical charging, the proportion of a tetragonal phase in the lithium manganese-based oxide may increase as a cubic phase inside the lithium manganese-based oxide changes to the tetragonal phase. The increased tetragonal phase in the lithium manganese-based oxide may cause the structural instability of the positive electrode active material and a voltage drop and make the charging and discharging of the secondary battery unstable. However, according to the present invention, it is possible to improve initial efficiency by compensating for the irreversible capacity of the negative electrode in the process of increasing stability by reducing the unstable phase of lithium manganese-based oxide by the charging process to be described below, and improve lifetime characteristics through charging and discharging that reduces or minimizes the generation of the unstable phase.

The lithium manganese-based oxide may be a compound represented by the following Chemical Formula 1.

$$LiMn_{2-x}M_xO_4 \qquad \text{[Chemical Formula 1]}$$

In the above Chemical Formula 1, M may be one or more selected from the group consisting of Ni, Co, Al, B, Ba, Ca, Zr, Ti, Mg, Ta, Nb, Sr, W, and Mo, and $0 \leq x 0.1$.

The lithium manganese-based oxide may have a spinel structure. Since the spinel structure has higher structural stability than a layer structure or an olivine structure, lithium can be stably intercalated into the lithium manganese-based oxide.

The positive electrode active material may contain 80 wt % or more and preferably 95 wt % or more of the lithium manganese-based oxide, and when the above range is satisfied, it is preferable because lithium can be stably supplied to the positive electrode and the negative electrode can be smoothly pre-lithiated through the first charging, resting, and second charging processes to be described below.

The positive active material may include other lithium-containing metal oxides known in the art in addition to the lithium manganese-based oxide.

The lithium-containing metal oxide may be one or more selected from the group consisting of a lithium-manganese-based oxide (e.g., $LiMnO_2$, $LiMn_2O_4$), a lithium-cobalt-based oxide (e.g., $LiCoO_2$), a lithium-nickel-based oxide (e.g., $LiNiO_2$), a lithium-nickel-manganese-based oxide (e.g., $LiNi_{1-y}Mn_yO_2$ (here, $0<Y<1$), $LiMn_{2-z}Ni_zO_4$ (here, $0<Z<2$)), a lithium-nickel-cobalt-based oxide (e.g., $LiNi_{1-Y1}Co_{Y1}O_2$ (here, ($<Y1<1$)), a lithium-manganese-cobalt-based oxide (e.g., $LiCo_{1-Y2}Mn_{Y2}O_2$ (here, ($<Y2<1$), $LiMn_{2-Z1}Co_{Z1}O_4$ (here, $0<Z1<2$)), a lithium-nickel-manganese-cobalt-based oxide (e.g., $Li(Ni_pCo_qMn_{r1})O_2$ (here, $0<p<1$, $0<q<1$, $0<r1<1$, and $p+q+r1=1$), $Li(Ni_{p1}Co_{q1}Mn_{r2})O_4$ (here, $0<p1<2$, $0<q1<2$, $0<r2<2$, and $p1+q1+r2=2$)), and a lithium-nickel-cobalt-transition metal ($M^1$) oxide (e.g., $Li(Ni_{p2}CO_{q2}Mn_{r3}M^1_{s2})O_2$ (here, $M^1$ is selected from the group consisting of Al, Fe, V, Cr, Ti, Ta, Mg and Mo, and p2, q2, r3, and s2 represent an atomic fraction of each independent element, and satisfy $0<p2<1$, $0<q2<1$, $0<r3<1$, $0<s2<1$, and $p2+q2+r3+s2=1$)).

The positive electrode may include a positive electrode current collector and a positive electrode active material layer formed on the positive electrode current collector, and the positive electrode active material layer may include the above-described positive electrode active material.

The positive electrode current collector is not particularly limited as long as it does not cause a chemical change in a battery and has conductivity, and for example, stainless steel, aluminum, nickel, titanium, calcined carbon, or aluminum or stainless steel whose surface has been treated with carbon, nickel, titanium, silver, or the like may be used.

The positive electrode current collector may typically have a thickness of 3 µm to 500 µm.

The positive electrode active material may be the same as the above-described positive electrode active material. The positive electrode active material may be included in an amount of 60 wt % to 99 wt % and preferably 80 wt % to 98 wt % in the positive electrode active material layer.

The positive electrode active material layer may optionally include one or more additives selected from a positive electrode binder and a positive electrode conductive material in addition to the positive electrode active material.

The positive electrode binder is a component that assists in the bonding of an active material with a conductive material or the like or with a current collector, and can be typically added in an amount of 0.5 wt % to 30 wt % based on a total weight of the positive electrode active material layer. Examples of the binder include polyvinylidene fluoride, polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene terpolymer (EPDM), a sulfonated-EPDM, styrene-butadiene rubber, fluororubber, and various copolymers.

The positive electrode conductive material is not particularly limited as long as it does not cause a chemical change in a battery and has conductivity, and for example, graphite; a carbon-based material such as carbon black, acetylene black, KETJEN BLACK, channel black, furnace black, lamp black, or thermal black; a conductive fiber such as a carbon fiber or a metal fiber; fluorocarbon; a metal powder such as an aluminum powder or a nickel powder; a conductive whisker such as zinc oxide or potassium titanate; a conductive metal oxide such as titanium oxide; and a conductive material such as a polyphenylene derivative may be used. Specific examples of commercially available conductive materials include the acetylene black series (products of Chevron Chemical Company, Denka Black (Denka Singapore Private Limited), products of Gulf Oil Company, etc.), KETJEN BLACK (a conductive carbon black), the EC series (products of Armak Company and VULCAN XC-72 (a conductive carbon black) (product of Cabot Company)), and SUPER P (a conductive carbon black) (TIMCAL).

The positive electrode conductive material may be included in an amount of 0.5 wt % to 30 wt % based on a total weight of the positive electrode active material layer.

The positive electrode active material layer may be formed by preparing a positive electrode slurry by adding a positive electrode active material and optionally an additive including a positive electrode binder and/or a positive electrode conductive material to a solvent, applying the positive electrode slurry onto the positive electrode current collector, and performing roll-pressing and drying.

The solvent may include an organic solvent such as N-methyl-2-pyrrolidone (NMP) and may be used in an amount to have a preferable viscosity when the positive electrode active material and optionally a positive electrode binder, a positive electrode conductive material, and the like are included. For example, the solvent may be included such that the concentration of solids including the positive electrode active material and optionally a positive electrode binder and a positive electrode conductive material is in the range of 50 wt % to 95 wt % and preferably 70 wt % to 90 wt %.

The lithium metal counter electrode may function as a counter electrode for the positive electrode during charging for the over-lithiation of the positive electrode.

The lithium metal counter electrode may serve as a lithium source for transferring lithium ions into the positive electrode when the positive electrode is over-lithiated by the charging of the pre-lithiation cell. The lithium metal counter electrode may be in the form of a sheet and is disposed opposite to the positive electrode.

The thickness of the lithium metal counter electrode may be appropriately set in consideration of the loading amount of the positive electrode and the degree of over-lithiation, and specifically, may be in the range of 1 μm to 500 μm and preferably 40 μm to 200 μm.

The pre-lithiation cell may additionally include a separator interposed between the positive electrode and the lithium metal counter electrode. The separator is capable of preventing an electrode short circuit phenomenon that may occur when the positive electrode and the lithium metal counter electrode are in direct contact during charging of the positive electrode, and preventing a problem that a rate of lithium intercalation into the positive electrode is not controlled when the positive electrode and the lithium metal counter electrode are in direct contact.

The separator is used to provide a passage for lithium ion migration, and a separator that exhibits low resistance to the migration of electrolyte ions and has an excellent electrolyte impregnation ability is preferred. Specifically, a porous polymer film, for example, a porous polymer film formed of a polyolefin-based polymer such as an ethylene homopolymer, a propylene homopolymer, an ethylene/butene copolymer, an ethylene/hexene copolymer, or an ethylene/methacrylate copolymer or a stacked structure having two or more layers thereof, may be used. In addition, a common porous non-woven fabric, for example, a non-woven fabric made of high-melting-point glass fiber or a polyethylene terephthalate fiber may be used. Also, in order to ensure heat resistance or mechanical strength, a coated separator that includes a ceramic component or polymer material and is optionally in a single-layer or multi-layer structure may be used.

The thickness of the separator may be in the range of 3 μm to 50 μm and preferably 8 μm to 20 μm in terms of allowing lithium to be smoothly intercalated/diffused into a negative electrode and achieving uniform pre-lithiation.

The pre-lithiation cell may additionally include an electrolyte. Specifically, the electrolyte may be injected into the pre-lithiation cell.

The electrolyte may include an organic solvent and a lithium salt.

As the organic solvent, any organic solvent that can serve as a medium through which ions involved in an electrochemical reaction of a battery can move may be used without particular limitation. Specifically, as the organic solvent, an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), ethyl methyl carbonate (EMC), ethylene carbonate (EC), propylene carbonate (PC), or fluoroethylene carbonate (FEC); an alcohol-based solvent such as ethyl alcohol or isopropyl alcohol; a nitrile such as R—CN (R is a C2-C20 hydrocarbon group with a linear, branched, or cyclic structure and may include a double-bonded aromatic ring or an ether linkage); an amide such as dimethylformamide; a dioxolane such as 1,3-dioxolane; or a sulfolane may be used. Among these, a carbonate-based solvent is preferable, and a combination of a cyclic carbonate having high ionic conductivity and a high dielectric constant, which is capable of improving the charging/discharging performance of a battery (e.g., EC, PC, or FEC), and a linear carbonate-based compound having low viscosity (e.g., EMC, DMC, or DEC) is more preferable. In this case, when the cyclic carbonate and the linear carbonate are mixed in the volume ratio of about 1:9 to about 5:5 and used, electrolyte performance can be excellent. More preferably, a combination of FEC which is a cyclic carbonate and DEC which is a linear carbonate is preferable in terms of improving electrolyte performance.

As the lithium salt, any compound capable of providing lithium ions used in a lithium secondary battery may be used without particular limitation. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used. The lithium salt is preferably used within a concentration range of 0.1 to 2.0 M. When the concentration of the lithium salt is within the above range, since the electrolyte has appropriate conductivity and viscosity, electrolyte performance can be excellent, and lithium ions can effectively move.

The electrolyte may additionally include an additive for forming a stable and flexible SEI layer on a negative electrode including a silicon-based active material. Specifically, the additive may include one or more selected from the group consisting of vinylene carbonate (VC), polystyrene (PS), succinonitrile, ethylene glycol bis(propionitrile) ether, and lithium bis(fluorosulfonyl)imide and preferably VC in terms of easily and stably forming an SEI layer through ring-opening polymerization.

The additive may be included in an amount of 0.1 wt % to 15 wt % and preferably 0.5 wt % to 5 wt % in the electrolyte.

The over-lithiation of the positive electrode may be performed by charging the pre-lithiation cell.

The over-lithiation may be carried out by charging the pre-lithiation cell with a current of 0.02 C to 1 C and more preferably 0.05 C to 0.2 C, and when electrochemical charging is performed with a current in the above range, it is preferable because it is possible to perform over-lithiation at a preferable rate, and at the same time, precisely control the desired over-lithiation by preventing the abrupt phase change of the positive electrode active material which may occur when the cell is charged at an excessively high rate.

The over-lithiation may be achieved by electrochemically charging the pre-lithiation cell so that the positive electrode is charged to 110% to 180%, preferably 130% to 170%, and more preferably 150% to 165% of positive electrode charge capacity. When the positive electrode is over-lithiated within the above range, the irreversible capacity of the negative electrode can be sufficiently compensated for by the pre-lithiation process to be described below, and at the same time, the instability of charging and discharging that occurs when the proportion of a tetragonal phase in the lithium manganese-based oxide is excessively increased due to excessive over-lithiation can be prevented, and since extra lithium remaining after the pre-lithiation of the negative electrode is used for charging and discharging, the lifetime characteristics of the secondary battery can be improved.

<Manufacture of Secondary Battery>

The method of manufacturing a secondary battery of the present invention includes separating the over-lithiated positive electrode from the pre-lithiation cell and fabricating a secondary battery including the over-lithiated positive electrode and a negative electrode including a negative electrode active material.

The over-lithiated positive electrode separated from the pre-lithiation cell may be provided as a positive electrode of the secondary battery. When lithium in the over-lithiated positive electrode is supplied into the negative electrode by a charging process to be described below, pre-lithiation that compensates for the irreversible capacity of the negative electrode active material is achieved.

When separating the over-lithiated positive electrode from the pre-lithiation cell, a process of washing the over-lithiated positive electrode may be performed. A solvent such as DMC may be used for the washing.

The secondary battery includes the over-lithiated positive electrode and a negative electrode.

The negative electrode may be disposed opposite to the over-lithiated positive electrode.

The negative electrode includes a negative electrode active material. The negative electrode active material may include one or more selected from a carbon-based active material and a silicon-based active material. The negative electrode active material preferably includes a silicon-based active material in that since the irreversible capacity of a silicon-based active material is greater than that of a carbon-based active material, battery performance can be improved through the pre-lithiation of the silicon-based active material.

The silicon-based active material may include a compound represented by the following Chemical Formula 2.

$$SiO_y \qquad \text{[Chemical Formula 2]}$$

In the above Chemical Formula 2, $0 \le y < 2$. Since $SiO_2$ does not react with lithium ions and thus cannot store lithium, it is preferable that y satisfies the above range.

Specifically, the silicon-based active material may include Si. Although Si is usually advantageous in terms of having about 2.5 to 3 times higher capacity than silicon oxides (e.g., $SiO_y$ $(0<y<2)$), Si has a high irreversible capacity and undergoes more severe volume expansion/contraction than silicon oxides due to charging and discharging and thus is relatively difficult to commercialize. However, according to the present invention, the irreversible capacity of Si can be uniformly and smoothly compensated for through the first charging, resting, and second charging processes to be described below, and since Si can be stably pre-lithiated, the problem of degradation in lifetime characteristics due to the volume expansion of the silicon-based active material can be effectively solved, and high capacity and energy density, which are advantages of the silicon-based active material, can be more preferably realized. Specifically, the silicon-based active material may be mainly formed of Si, and more specifically, the silicon-based active material may be formed of Si.

The average particle diameter $(D_{50})$ of the silicon-based active material may be in the range of 0.1 μm to 50 μm and preferably 0.5 μm to 15 μm in terms of ensuring the structural stability of the negative electrode active material during charging and discharging.

The carbon-based active material may include one or more selected from the group consisting of artificial graphite, natural graphite, hard carbon, soft carbon, carbon black, graphene, and fibrous carbon and preferably includes one or more selected from the group consisting of artificial graphite and natural graphite.

The average particle diameter $(D_{50})$ of the carbon-based active material may be in the range of 1 the range of based active material may be one or more selected from the group consisting of artificial graphite, natural graphite, hardcharging and discharging.

The negative electrode may include: a negative electrode current collector; and a negative electrode active material layer formed on the negative electrode current collector, and the negative electrode active material layer may include the above-described negative electrode active material.

The negative electrode current collector may include one or more selected from copper, stainless steel, aluminum, nickel, titanium, calcined carbon, and an aluminum-cadmium alloy and preferably includes copper.

The thickness of the negative electrode current collector may be typically in the range of 3 μm to 500 μm and preferably 5 μm to 50 μm.

The negative electrode current collector may have fine irregularities formed in a surface thereof to increase the adhesion of the negative electrode active material. For example, the negative electrode current collector may be used in any of various forms such as a film, a sheet, a foil, a net, a porous material, a foam, and a non-woven fabric.

The negative electrode active material may be included in an amount of 60 wt % to 90 wt % and preferably 70 wt % to 85 wt % in the negative electrode active material layer.

The negative electrode active material layer may additionally include a negative electrode binder and a negative electrode conductive material in addition to the negative electrode active material.

The negative electrode binder may be used to improve adhesion between the negative electrode active material and the negative electrode current collector or to increase bonding between the negative electrode active materials.

Specifically, the negative electrode binder may include one or more selected from the group consisting of styrene-butadiene rubber (SBR), acrylonitrile butadiene rubber, acrylic rubber, butyl rubber, fluororubber, polyvinyl alcohol, CMC, starch, hydroxypropyl cellulose, regenerated cellulose, polyvinyl alcohol (PVA), polyacrylic acid (PAA), polyethylene glycol (PEG), polyacrylonitrile (PAN), and polyacrylamide (PAM).

Preferably, the negative electrode binder includes one or more selected from the group consisting of PVA, PAA, PAN, and PAM and preferably PVA and PAM in terms of having high strength, excellent resistance to the volume expansion/contraction of the negative electrode active material, and being capable of preventing the distortion or warpage of the electrode by imparting excellent flexibility to the negative electrode binder. When the negative electrode binder includes PVA and PAM, the negative electrode binder may be a copolymer of PVA and PAM and specifically a copolymer of PVA and PAM having units derived from vinyl alcohol and units derived from acrylamide.

The negative electrode binder may include a negative electrode binder in which hydrogen therein is substituted with Li, Na, Ca, or the like, in terms of ensuring better dispersion in a water-based solvent such as water when preparing a slurry for forming the negative electrode active material layer, and improving bonding by more smoothly coating the active material.

The negative electrode binder may be included in an amount of 5 wt % to 30 wt % and preferably 10 wt % to 20 wt % in the negative electrode active material layer, and when the above range is satisfied, since the negative electrode active material can be smoothly bonded, the problem of active material volume expansion can be minimized, and at the same time, the negative electrode binder can be easily dispersed during the preparation of a slurry for forming the negative electrode active material layer, and the coating ability and phase stability of the slurry can be improved.

The negative electrode conductive material may be used to assist and improve conductivity in the secondary battery, and is not particularly limited as long as it does not cause a chemical change and has conductivity. Specifically, the negative electrode conductive material may include one or more selected from the group consisting of: graphite such as natural graphite or artificial graphite; carbon black such as acetylene black, KETJEN BLACK (a conductive carbon black), channel black, furnace black, lamp black, or thermal black; a conductive fiber such as a carbon fiber or a metal fiber; a conductive tube such as a carbon nanotube; fluorocarbon; a metal powder such as an aluminum powder or a nickel powder; a conductive whisker such as zinc oxide or potassium titanate; a conductive metal oxide such as titanium oxide; and a conductive material such as a polyphenylene derivative, and preferably includes a combination of carbon black, graphite, and carbon nanotubes in terms of realizing high conductivity.

The negative electrode conductive material may have a specific surface area of 80 $m^2$/g to 200 $m^2$/g and preferably 100 $m^2$/g to 150 $m^2$/g in terms of facilitating the dispersion of the negative electrode conductive material during the preparation of a slurry for forming the negative electrode active material layer and further improving electrical conductivity.

The negative electrode conductive material may be included in an amount of 5 wt % to 20 wt % and preferably 7 wt % to 15 wt % in the negative electrode active material layer, and when the above range is satisfied, it is preferable because it is possible to form an excellent conductive network while mitigating an increase in resistance caused by the negative electrode binder.

The thickness of the negative electrode active material layer may be in the range of 10 μm to 100 μm and preferably 20 μm to 50 μm.

The secondary battery may include, in addition to the over-lithiated positive electrode and the negative electrode; a separator interposed between the over-lithiated positive electrode and the negative electrode; and an electrolyte.

The separator may be interposed between the over-lithiated positive electrode and the negative electrode.

The separator is used to separate the negative electrode and the positive electrode and provide a passage for lithium ion migration, and any separator commonly used in a lithium secondary battery may be used without particular limitation, and in particular, a separator that exhibits low resistance to the migration of electrolyte ions and has an excellent electrolyte impregnation ability is preferred. Specifically, a porous polymer film, for example, a porous polymer film formed of a polyolefin-based polymer such as an ethylene homopolymer, a propylene homopolymer, an ethylene/butene copolymer, an ethylene/hexene copolymer, or an ethylene/methacrylate copolymer or a stacked structure having two or more layers thereof, may be used. In addition, a common porous non-woven fabric, for example, a non-woven fabric made of high-melting-point glass fiber, a polyethylene terephthalate fiber, or the like, may be used. Also, in order to ensure heat resistance or mechanical strength, a coated separator that includes a ceramic component or polymer material and is optionally in a single-layer or multi-layer structure may be used.

Examples of the electrolyte include, but are not limited to, an organic liquid electrolyte, an inorganic liquid electrolyte, a solid polymer electrolyte, a gel-type polymer electrolyte, an inorganic solid electrolyte, and a molten-type inorganic electrolyte which are usable for manufacturing a secondary battery.

Specifically, the electrolyte may include an organic solvent and a lithium salt.

As the organic solvent, any organic solvent that can serve as a medium through which ions involved in an electrochemical reaction of a battery can move may be used without particular limitation. Specifically, as the organic solvent, an ester-based solvent such as methyl acetate, ethyl acetate, γ-butyrolactone, ¿-caprolactone, or the like; an ether-based solvent such as dibutyl ether, tetrahydrofuran, or the like; a ketone-based solvent such as cyclohexanone or the like; an aromatic hydrocarbon-based solvent such as benzene, fluorobenzene, or the like; a carbonate-based solvent such as DMC, DEC, EMC, EC, or PC; an alcohol-based solvent such as ethyl alcohol or isopropyl alcohol; a nitrile such as R—CN (R is a C2-C20 hydrocarbon group with a linear, branched, or cyclic structure and may include a double-bonded aromatic ring or an ether linkage); an amide such as dimethylformamide; a dioxolane such as 1,3-dioxolane; or a sulfolane may be used. Among these, a carbonate-based solvent is preferable, and a combination of a cyclic carbonate having high ionic conductivity and a high dielectric constant, which is capable of improving the charging/discharging performance of a battery (e.g., EC or PC), and a linear carbonate-based compound having low viscosity (e.g., EMC, DMC, or DEC) is more preferable. In this case, when the cyclic carbonate and the linear carbonate are mixed in the volume ratio of about 1:1 to about 1:9 and used, electrolyte performance can be excellent.

As the lithium salt, any compound capable of providing lithium ions used in a lithium secondary battery may be used without particular limitation. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, $LiB(C_2O_4)_2$, or the like may be used. The lithium salt is preferably used within a concentration range of 0.1 to 2.0 M. When the concentration of the lithium salt is within the above range, since the electrolyte has appropriate conductivity and viscosity, electrolyte performance can be excellent, and lithium ions can effectively move.

<First Charging>

The method of manufacturing a secondary battery of the present invention includes subjecting the secondary battery to a first charging.

As will be described below, in the method of manufacturing a secondary battery of the present invention, the secondary battery is charged through first charging, resting, and second charging, and as lithium is transferred from the over-lithiated positive electrode to the negative electrode, the pre-lithiation of the negative electrode can be achieved. In particular, in the method of manufacturing a secondary battery of the present invention, the resting process is carried out between the first charging and the second charging, and the maximum voltage of the secondary battery in the first charging is lower than the maximum voltage of the secondary battery in the second charging. Since the first charging of the secondary battery is performed at a relatively low voltage, a reverse potential phenomenon occurring due to the over-lithiation of the positive electrode can be resolved, and since the proportion of an unstable phase of the positive electrode active material formed due to the over-lithiation of the positive electrode can be reduced, voltage can be stably increased in the second charging described below, and since lithium ions can be stably transferred into the negative electrode, the irreversible capacity of the negative electrode can be smoothly compensated for, the initial efficiency of the negative electrode can be improved, and the lifetime performance of the secondary battery can be improved. When the first charging and second charging of the secondary battery are performed as one step rather than separately, since the pre-lithiation of the negative electrode occurs by the positive electrode having a high proportion of an unstable phase, there is a problem that charging becomes unstable or a voltage drop occurs, and accordingly, since it is difficult to smoothly compensate for the irreversible capacity of the negative electrode through pre-lithiation, it is difficult to improve the initial efficiency and lifetime performance of the negative electrode.

The maximum voltage of the secondary battery in the first charging may be in the range of 2.5 V to 3.6 V and preferably 2.9 V to 3.1 V, and when the first charging of the secondary battery is performed up to the above-described low voltage range, since the proportion of the tetragonal phase of the lithium manganese-based oxide increased due to over-lithiation can be reduced and the proportion of a stable cubic phase in the lithium manganese-based oxide can be increased, stable charging is possible during the second charging to be described below, and therefore, the pre-lithiation of the negative electrode can be smoothly achieved.

The first charging may be performed in a constant current mode (CC mode) or a constant current/constant voltage mode (CC/CV mode), and is more preferably performed in a CC/CV mode. For example, in the case of performing the first charging in a CC/CV mode, when CC charging is performed and then CV charging is performed, since a voltage level capable of changing the tetragonal lithium manganese-based oxide phase to the cubic lithium manganese-based oxide phase can be continuously maintained, which is advantageous for stabilizing the positive electrode, and a more stable pre-lithiation of the negative electrode can be achieved in the second charging to be described below.

The first charging may be performed by charging the secondary battery with a current of 0.02 C to 1 C and more preferably 0.05 C to 0.2 C, and when the secondary battery is electrochemically charged with a current in the above range, it is preferable because, as the unstable phase of the over-lithiated positive electrode changes to a stable phase, an appropriate charging rate can be secured, and overall process execution time can be shortened.

<Potential Difference Control>

The method of manufacturing a secondary battery of the present invention may additionally include adjusting a potential difference between the over-lithiated positive electrode and the negative electrode to be 0 V before performing the first charging.

The step of adjusting the potential difference between the over-lithiated positive electrode and the negative electrode to be 0 V eliminates the risk of occurrence of a reverse potential between the over-lithiated positive electrode and the negative electrode before performing the first charging so that stable charging can be smoothly performed in the first charging.

The step of adjusting the potential difference between the over-lithiated positive electrode and the negative electrode to be 0 V may be performed by electrochemically charging the secondary battery or allowing the secondary battery to stand. Specifically, the secondary battery may be electrochemically charged so that the potential difference between the over-lithiated positive electrode and the negative electrode becomes 0 V, or the secondary battery may be allowed to stand to cause the over-lithiated positive electrode to be self-discharged, so that the risk of occurrence of reverse potential between the over-lithiated positive electrode and the negative electrode can be eliminated.

<Resting>

The method of manufacturing a secondary battery of the present invention includes resting the first-charged secondary battery. The resting step separates the first charging and the second charging.

Even after the first charging, some of the lithium manganese-based oxide, which has not changed into a stable cubic phase, may remain depending on the degree of over-lithiation of the positive electrode, the resistance of the cell itself, or the like. Since the proportion of the unstable tetragonal phase in the positive electrode can be effectively reduced through the resting process, a more stable charging process can be performed in the second charging. When charging the secondary battery in one step without performing the resting process, since the negative electrode is pre-lithiated by a positive electrode having a high proportion of unstable phase, there is a problem that charging becomes unstable or a voltage drop occurs, and accordingly, since the irreversible capacity of the negative electrode cannot be smoothly compensated for through pre-lithiation, it is difficult to improve the initial efficiency and lifetime performance of the negative electrode.

The resting step may be performed for 10 minutes to 120 minutes and preferably 30 minutes to 60 minutes in terms of stably maintaining the potential and effectively reducing the proportion of unstable tetragonal phase in the positive electrode.

<Second Charging>

The method of manufacturing a secondary battery of the present invention includes subjecting the rested secondary battery to a second charging. In this case, a charging voltage in the first charging is lower than a charging voltage in the second charging.

The second charging is a charging process performed after resolving the issue of reverse potential between the over-lithiated positive electrode and the negative electrode through the first charging and increasing the proportion of a stable phase in the positive electrode active material in the positive electrode through the resting process, and is performed at a higher charging voltage than the first charging. When lithium is transferred from the positive electrode into the negative electrode through the second charging, the charging process including the pre-lithiation of the negative electrode is completed.

The maximum voltage of the secondary battery in the second charging may be in the range of 4.0 V to 4.5 V and preferably 4.1 V to 4.3 V, and when the above range is satisfied, it is preferable because the degradation of the positive electrode due to the formation of an excessively high potential can be prevented and the pre-lithiation of the negative electrode can be effectively performed.

The second charging may be performed in a CC mode or a CC/CV mode, and is more preferably performed in a CC/CV mode.

The second charging may be performed by charging the secondary battery with a current of 0.02 C to 1 C and more preferably 0.05 C to 0.2 C. When the secondary battery is electrochemically charged with a current in the above range, it is preferable because the negative electrode can be stably and rapidly pre-lithiated.

The secondary battery manufactured by the above-described method is useful in the field of portable devices such as mobile phones, laptop computers, and digital cameras, and electric vehicles such as hybrid electric vehicles (HEVs).

In addition, the secondary battery is applicable to a battery module including the secondary battery as a unit cell or a battery pack including the same.

The battery module or the battery pack is applicable as a power source for one or more medium-to-large sized devices selected from among power tools, electric vehicles (EVs), including HEVs and plug-in hybrid electric vehicles (PHEVs), and power storage systems.

<Method of Using Secondary Battery>

Another aspect of the present invention provides a method of using a secondary battery manufactured by the above-described method of manufacturing a secondary battery.

Specifically, the method of using a secondary battery includes charging and discharging a secondary battery manufactured by the above-described method of manufacturing a secondary battery by setting a minimum voltage at 2.5 V to 3.6 V.

When the secondary battery manufactured by the above-described method of manufacturing a secondary battery is charged and discharged at the minimum voltage in the above range, high energy density can be achieved, and at the same time, stable charging and discharging are possible, and a cycle capacity retention rate can be improved.

When charging and discharging the secondary battery by setting a minimum voltage at less than 2.5 V, an irreversible structural change of the positive electrode active material may occur as the positive electrode is over-lithiated or overdischarged, and there is a risk that lifetime performance may be significantly reduced due to the occurrence of a positive electrode structure having a continuously low potential. When charging and discharging the secondary battery by setting a minimum voltage at more than 3.6 V, since the range of usable voltage is narrowed, a required energy density level may not be achieved.

The minimum voltage of the secondary battery is preferably set at 3.0 V to 3.6 V, and when the minimum voltage is within the above range, since the over-lithiation of the positive electrode can be prevented, lifetime performance can be significantly improved.

According to the method of using a secondary battery, the secondary battery may be charged and discharged by setting a maximum voltage at 4.0 V to 4.5 V and preferably 4.1 V to 4.2 V. When the maximum voltage is set within the above range, the problem in which Mn ions are excessively eluted due to the generation of a high potential in the positive electrode, damaging the positive electrode, can be prevented, and the problems in which lifetime performance significantly decreases due to the volume expansion of the negative electrode active material and a lifetime improvement effect is reduced due to pre-lithiation can be prevented.

In the method of using a secondary battery, the minimum voltage and maximum voltage of the secondary battery may be set using a control unit capable of controlling a driving voltage range during the charging and discharging of the secondary battery, specifically, an electrochemical charger/discharger. Specifically, the control unit may be embedded in a battery management system (BMS) included in a battery pack.

Hereinafter, exemplary embodiments of the present invention will be described in detail so that those of ordinary skill in the art can easily implement the present invention. However, the present invention may be implemented in various different forms and is not limited to the embodiments described herein.

EXAMPLES

Example 1

<Over-Lithiation of Positive Electrode>

A positive electrode slurry was prepared by adding $LiMn_2O_4$ (average particle diameter ($D_{50}$): 10 μm) as a positive electrode active material, carbon nanotubes (CNTs) as a positive electrode conductive material, and polyvinylidene fluoride (PVdF) as a positive electrode binder in the weight ratio of 96:2:2 to an NMP solvent for forming a positive electrode slurry.

To produce a positive electrode, a positive electrode active material layer was formed by applying the positive electrode slurry onto one side of an aluminum current collector (thickness: 15 μm) used as a positive electrode current collector and roll-pressing and drying the slurry for 10 hours in a vacuum oven at a temperature of 120° C. to 130° C.

A pre-lithiation cell was produced by providing the positive electrode and a lithium metal counter electrode opposite to the positive electrode, interposing a polyethylene separator between the positive electrode and the lithium metal counter electrode, and injecting an electrolyte.

The pre-lithiation cell was connected to an electrochemical charger/discharger and electrochemically charged at 0.1 C to 120% of positive electrode charge capacity to over-lithiate the positive electrode.

<Manufacture of Secondary Battery>

The over-lithiated positive electrode was separated from the pre-lithiation cell and then washed with DMC.

A negative electrode slurry was prepared by mixing, in a weight ratio of 75:15:15, silicon-based active material Si (average particle diameter ($D_{50}$): 1 μm) as a negative electrode active material, a mixture of carbon black, graphite, and single-walled CNTs as a negative electrode conductive material, and a copolymer of PAA and PAM as a negative electrode binder and adding the resultant to distilled water used as a solvent for forming a negative electrode slurry.

To produce a negative electrode, a negative electrode active material layer was formed by applying the negative electrode slurry onto one side of a copper current collector (thickness: 10 μm) used as a negative electrode current collector and roll-pressing and drying the slurry for 10 hours in a vacuum oven at a temperature of 130° C.

A secondary battery was produced by interposing a separator having a polypropylene/polyethylene/polypropylene triple membrane structure between the negative electrode and positive electrode produced above and injecting an electrolyte. As the electrolyte, an electrolyte prepared by adding, to an organic solvent formed of FEC and EMC mixed in a volume ratio of 30:70, 1.5 wt % (based on the total weight of electrolyte) VC, 0.5 wt % (based on the total weight of electrolyte) 1,3-propanesultone, and 1 M $LiPF_6$ as a lithium salt was used.

<Potential Difference Control>

To adjust a potential difference between the positive electrode and the negative electrode to be 0 V, the secondary battery produced above was maintained at room temperature (20° C.) for 48 hours.

<First Charging, Resting, and Second Charging>

The secondary battery in which the potential difference was adjusted to be 0 V was subjected to first charging. The first charging was performed in a CC/CV mode, wherein the CC charging was performed at a current of 0.1 C, and the maximum voltage of the secondary battery was 3.0 V (0.05 C cut-off).

The first charged secondary battery was rested for 30 minutes.

After the resting, the secondary battery was subjected to second charging. The second charging was performed in a CC/CV mode, wherein the CC charging was performed at a current of 0.1 C, and the maximum voltage of the secondary battery was 4.2 V (0.05 C cut-off).

Example 2

A secondary battery was manufactured in the same manner as in Example 1 except that when over-lithiating a positive electrode by electrochemically charging a pre-lithiation cell, the positive electrode was charged to 140% of positive electrode charge capacity.

Example 3

A secondary battery was manufactured in the same manner as in Example 1 except that when over-lithiating a positive electrode by electrochemically charging a pre-lithiation cell, the positive electrode was charged to 160% of positive electrode charge capacity.

Comparative Example 1

A secondary battery was manufactured in the same manner as in Example 1 except that, instead of performing first charging, resting, and second charging, only one charging step (CC/CV method, CC: 0.1 C charge, CV: 4.2 V, 0.05 C cut-off) was performed at a maximum voltage of 4.2 V.

Comparative Example 2

A secondary battery was manufactured in the same manner as in Example 2 except that, instead of performing first charging, resting, and second charging, only one charging step (CC/CV method, CC: 0.1 C charge, CV: 4.2 V, 0.05 C cut-off) was performed at a maximum voltage of 4.2 V.

Comparative Example 3

A positive electrode was manufactured in the same manner as in Example 1 except that the over-lithiation process was not performed. In addition, a secondary battery was manufactured in the same manner as in Example 1 except that the above-described positive electrode was used.

EXPERIMENTAL EXAMPLES

Experimental Example 1: Evaluation of Initial Efficiency

The charging/discharging reversibility of the secondary batteries manufactured in Examples 1 and 2 and Comparative Examples 1 and 2 was tested using an electrochemical charger/discharger. The charging was performed by applying a current at a current density of a 0.1 C-rate up to a voltage of 4.2 V, and the discharging was performed at the same current density up to a voltage of 3.0 V.

To test initial reversibility, initial efficiency was determined by the following equation. The results are shown in Table 1 below.

$$\text{Initial efficiency (\%)} = \text{(Discharge capacity at first cycle)}/\text{(Charge capacity at first cycle)} \times 100$$

TABLE 1

|  | Initial efficiency (%) |
| --- | --- |
| Example 1 | 100.06 |
| Example 2 | 99.91 |
| Comparative Example 1 | 95.38 |
| Comparative Example 2 | 98.85 |

Referring to Table 1, it can be seen that the secondary batteries of Examples 1 and 2, which were subjected to first charging, resting, and second charging, have improved initial efficiency compared to the secondary batteries of Comparative Examples 1 and 2.

Experimental Example 2: Evaluation of Cycle Capacity Retention Rate

To evaluate cycle capacity retention rates, the secondary batteries of Examples 1, 2, 3, and Comparative Example 3 were charged and discharged for a plurality of cycles.

Experimental Example 2-1

First, the secondary batteries of Examples 1, 2, 3, and Comparative Example 3 were charged and discharged for 10 cycles. Charging and discharging conditions are as follows.

<Charging and Discharging Conditions>

Charging: CC/CV mode at 0.1 C up to 4.2 V (4.2 V, 0.05 C current cut-off)

Discharging: CC mode at 0.1 C up to 3.0 V

Capacity retention rates were determined by the following equation, and capacity retention rates at the $10^{th}$ cycle are shown in Table 2 below.

Capacity retention rate (%)={(Discharge capacity at the $N^{th}$ cycle)/(Discharge capacity at the first cycle)}×100

(In the above equation, N is an integer from 1 to 10)

In addition, changes in the discharge capacity of the secondary batteries of Examples 1, 2, 3, and Comparative Example 3 during 10 cycles are shown in FIG. 1.

TABLE 2

|  | Cycle capacity retention rate (%) @ $10^{th}$ cycle |
| --- | --- |
| Example 1 | 97.6 |
| Example 2 | 99.6 |
| Example 3 | 100.3 |
| Comparative Example 3 | 93.2 |

2. Experimental Example 2-2

Upon completion of Experimental Example 2-1, the secondary batteries of Examples 1, 2, 3, and Comparative Example 3 were charged and discharged for 50 cycles. Charging and discharging conditions are as follows.
<Charging and Discharging Conditions>
Charging: CC/CV mode at 1 C up to 4.2 V (4.2 V, 0.05 C current cut-off)
Discharging: CC mode at 0.5 C up to 3.0 V
Capacity retention rates were determined by the following equation, and capacity retention rates at the $50^{th}$ cycle are shown in Table 3 below.

Capacity retention rate (%)={(Discharge capacity at the $N^{th}$ cycle)/(Discharge capacity at the first cycle)}×100

(In the above equation, N is an integer from 1 to 50)

In addition, changes in the discharge capacity of the secondary batteries of Examples 1, 2, 3, and Comparative Example 3 during 50 cycles are shown in FIG. 2.

TABLE 3

|  | Cycle retention rate (%) @ $50^{th}$ cycle |
| --- | --- |
| Example 1 | 83.8 |
| Example 2 | 88.6 |
| Example 3 | 96.3 |
| Comparative Example 3 | 72.9 |

Referring to Table 2, Table 3, and FIGS. 1 and 2, it can be seen that the secondary batteries of Examples 1, 2, and 3, which were subjected to first charging, resting, and second charging, have improved lifetime performance compared to the secondary battery of Comparative Example 3.

Experimental Example 3: Evaluation of Stability of Over-Lithiated Positive Electrode The stability of over-lithiated positive electrodes manufactured in Examples 2 and 3 was evaluated.

Specifically, FIG. 3 is a graph showing XRD analysis peaks of the over-lithiated positive electrode of Example 2, and FIG. 4 is a graph showing XRD analysis peaks of the over-lithiated positive electrode of Example 2 after being left in air for one week. In addition, FIG. 5 is a graph showing XRD analysis peaks of the over-lithiated positive electrode of Example 3, and FIG. 6 is a graph showing XRD analysis peaks of the over-lithiated positive electrode of Example 3 after being left in air for one week.

Referring to FIGS. 3 and 4, in the over-lithiated positive electrode of Example 2, no other peaks were further generated or appeared over time, and there was no change in the line width of each peak. In addition, referring to FIGS. 5 and 6, in the over-lithiated positive electrode of Example 3, no other peaks were further generated or appeared over time, and there was no change in the line width of each peak. Considering this, it can be seen that the over-lithiated positive electrodes prepared in Examples 2 and 3 exhibit stability even with the lapse of time without generating impurities due to side reactions or the like.

The invention claimed is:

1. A method of manufacturing a secondary battery, comprising:

electrochemically charging a pre-lithiation cell comprising a positive electrode, wherein the positive electrode comprises a positive electrode active material comprising a lithium manganese-based oxide and a lithium metal counter electrode, wherein the electrochemical charging over-lithiates the positive electrode to form an over-lithiated positive electrode;

separating the over-lithiated positive electrode from the pre-lithiation cell and fabricating a secondary battery comprising the over-lithiated positive electrode and a negative electrode comprising a negative electrode active material;

subjecting the secondary battery to a first charging to form a first-charged secondary battery, wherein a maximum voltage of the secondary battery in the first charging is in a range of 2.5 V to 3.6 V;

resting the first-charged secondary battery; and subjecting the rested secondary battery to a second charging, wherein a maximum voltage of the secondary battery in the first charging is lower than a maximum voltage of the secondary battery in the second charging, wherein the lithium manganese-based oxide has a spinel structure, wherein the over-lithiating is achieved by electrochemically charging the pre-lithiation cell so that the positive electrode is charged to 130% to 170% of a positive electrode charge capacity.

2. The method of claim 1, wherein the lithium manganese-based oxide is a compound represented by the following Chemical Formula 1:

$$LiMn_{2-x}M_xO_4, \quad \text{[Chemical Formula 1]}$$

wherein, in the above Chemical Formula 1, M is at least one selected from the group consisting of Ni, Co, Al, B, Ba, Ca, Zr, Ti, Mg, Ta, Nb, Sr, W, and Mo, and $0 \le x < 0.1$.

3. The method of claim 1, wherein the over-lithiating is achieved by electrochemically charging the pre-lithiation cell so that the positive electrode is charged to 150% to 165% of a positive electrode charge capacity.

4. The method of claim 1, wherein the negative electrode active material comprises at least one selected from the group consisting of a carbon-based active material and a silicon-based active material.

5. The method of claim 4, wherein the silicon-based active material comprises a compound represented by the following Chemical Formula 2:

$$SiO_y, \qquad \text{[Chemical Formula 2]}$$

wherein, in the above Chemical Formula 2, $0 \leq y < 2$.

6. The method of claim 1, wherein the resting is performed for 10 minutes to 120 minutes.

7. The method of claim 1, wherein the first charging is performed in a constant current mode or a constant current/constant voltage mode.

8. The method of claim 1, wherein a maximum voltage of the secondary battery in the second charging is in a range of 4.0 V to 4.5 V.

9. The method of claim 1, wherein the second charging is performed in a constant current mode or a constant current/constant voltage mode.

10. The method of claim 1, further comprising, before the first charging, adjusting a potential difference between the over-lithiated positive electrode and the negative electrode to be 0 V.

11. The method of claim 10, wherein the adjusting of the potential difference between the over-lithiated positive electrode and the negative electrode to be 0 V is achieved by electrochemically charging the secondary battery or allowing the secondary battery to stand.

\* \* \* \* \*